W. F. DE BRANDT.
HARVESTING MACHINE.
APPLICATION FILED JUNE 13, 1918.

1,372,282.

Patented Mar. 22, 1921.
5 SHEETS—SHEET 1.

Fig.1.

Inventor
William Francis de Brandt
by Lawrence Langner
Attorney

Inventor
William Francis de Brandt

Attorney

W. F. DE BRANDT.
HARVESTING MACHINE.
APPLICATION FILED JUNE 13, 1918.

1,372,282.

Patented Mar. 22, 1921.
5 SHEETS—SHEET 4.

Inventor
William Francis de Brandt by Lawrence Langner
Attorney

W. F. DE BRANDT.
HARVESTING MACHINE.
APPLICATION FILED JUNE 13, 1918.

1,372,282.

Patented Mar. 22, 1921.
5 SHEETS—SHEET 5.

Inventor
William Francis de Brandt by

Attorney

UNITED STATES PATENT OFFICE.

WILLIAM FRANCIS DE BRANDT, OF PERTH, WESTERN AUSTRALIA, AUSTRALIA, ASSIGNOR TO THE FOGARTY PATENT INTERCHANGEABLE HARVESTER CORPORATION LIMITED, OF PERTH, WESTERN AUSTRALIA, AUSTRALIA, A CORPORATION OF WESTERN AUSTRALIA.

HARVESTING-MACHINE.

1,372,282.     Specification of Letters Patent.     Patented Mar. 22, 1921.

Application filed June 13, 1918. Serial No. 239,711.

*To all whom it may concern:*

Be it known that I, WILLIAM FRANCIS DE BRANDT, a subject of the Republic of France, and resident of Perth, in the State of Western Australia and Commonwealth of Australia, secretary, have invented certain new and useful Improvements in and Relating to Harvesting-Machines, of which the following is a specification.

This invention relates to improvements in and relating to harvesting machines and has been devised in order to provide a machine of greater utility than those at present in use.

According to the present invention, the parts comprising the improved machine comprises a wheeled main frame, a reaper frame having a fulcrum thereon, means for adjusting the reaper frame to raise or lower the reaper mechanism relatively to the grain to be cut, counterbalancing means for facilitating the adjustment of the reaper and frame therefor, driving and steering mechanism, and a rigid or swivel division at approximately the center of the machine to enable it to be divided to obviate undue strain and to facilitate transportation of the machine, the arrangement and location of the parts being such that the machine may function as a stripper, stripper harvester, header, or reaper thresher.

In order that the invention may be more readily understood, it will now be described with reference to the accompanying drawings in which:—

The transport frame 1 comprises two main beams 2, arranged substantially parallel and close to each other, being strapped and supported by suitable stays, being formed in a plurality of parts secured by swivel or fixed connections, as hereinafter described.

At the rear, the main beams 2 are bent outwardly as at 3, then rearwardly as at 4, and are connected by a cross beam 5 to the rear of the main or rear axle 6 to form a firm and broad mounting therefor. The ends of the frame are supported on the main axle 6 by bearings 8 immediately inside the rear wheels 9. The outer edges of the hubs 10 which are formed with clutch teeth 11 engage a clutch 12 slidable on the axle 6, the teeth 11 being so positioned that only the forward movements of the wheels 9 are transmitted to the axle 6. Each of the slidable clutch members 12 is held in engagement with each of the wheel clutch members 10 by a spring 13 (preferably flat), which exerts inward pressure upon the clutch members 12, the spring 13 being connected to arms 14 fitted to the ends of a rear draft bar 15.

This rear draft bar 15 is arranged and fixed transversely of, upon the main frame 1, forwardly of the rear wheels 9, the arms 14 thereon engaging the ends of the rear axle. On either side of the main frame directly in front of the arms 14, the rear draft bar 15 is provided with special or other double or multiple swingle trees 16 which connect the harness of draft animals in such a manner as to give an equal distribution of the tractive pull.

The harness or traces from the draft animals, in addition to being connected to the rear swingle trees 16 are also connected to swingle trees on a front draft bar 18 which is arranged transversely of the main frame 1, and fixed thereto immediately to the rear of front steering wheels 19. The front and rear draft bars with their draft appliances maintain the animals in a direct line of travel, and dispense with the usual hand driving of the animals, which are guided by the steering movement of the machine.

Figure 12:
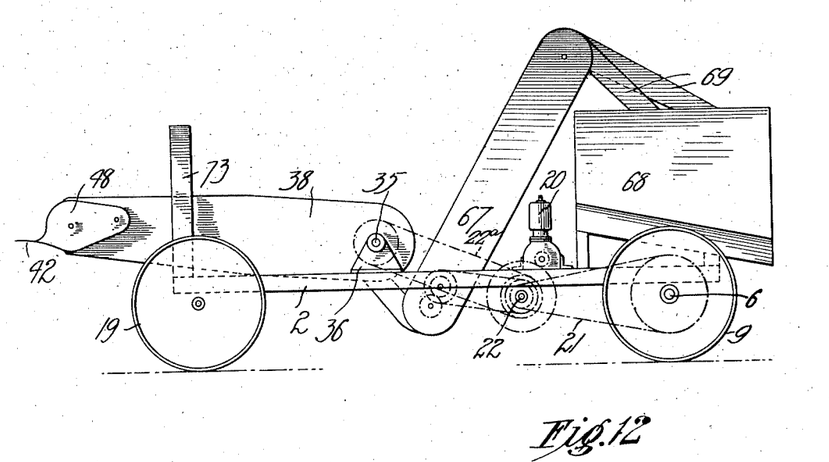
Fig. 12 is a view illustrating the machine, the working parts of which are adapted to be driven by a power generator independent of the traction power.

If desired and as illustrated in Fig. 12, the machine may be driven by one or more power generators 20, in which case the animal draft appliances will be dispensed with and the length of the frame consequently considerably reduced; or, alternatively, the frame may be hauled by the animal power and the whole or portion of the gear mechanism operating the harvester mechanism may be operated by power generators.

Should a power generator or generators only be employed, it will be obvious that the frame will also be modified to suit this condition, and the rear axle 6 would be driven by a chain or other suitable drive 21 from a counter shaft 22 and the harvesting mechanism likewise driven from this countershaft 22 by the chain or other suitable drive 22ª as illustrated in Fig. 12.

The main two longitudinal beams 2 of the main frame taper outwardly from the rear draft bar 15 toward the front draft bar 18 so allowing of greater freedom and stability for the reaper mechanism. The forward ends of the frame members 2 are bent outwardly as at 23, and terminate immediately behind the reaper mechanism, being connected by a transverse bar 24, to which are connected bearing brackets 25 supporting the stub axles 26 of the front steering wheels 19 as illustrated more particularly in Fig. 4.

For the purpose of steering the machine the stub axles 26 are interconnected by a rod 27, connecting an arm 28 secured to each axle 26. An arm 29 secured to one of the arms 28 is controlled through a rearwardly extending rod 30 on one side of the frame 1 having suitable gearing with a bevel gear or with a rod 32, on which is secured a hand wheel 33 adjacent to the driver's seat 34, and which is supported in bearing sleeves from the main frame 1.

Forwardly of the rear draft beam 15 and rearwardly of the front draft beam 18 is a single fulcrum support comprising a transverse spindle 35 mounted in bearings 36 upon the frame 1 and which forms a countershaft for the driving gear of the reaper mechanism, as well as the driving shaft for a longitudinal screw or other conveyer 37, arranged within a reaper frame 38. This fulcrum spindle 35 carries a bevel gearing 39 with a bevel gear 40 on the spindle 41 of the conveyer 37.

Figure 1:
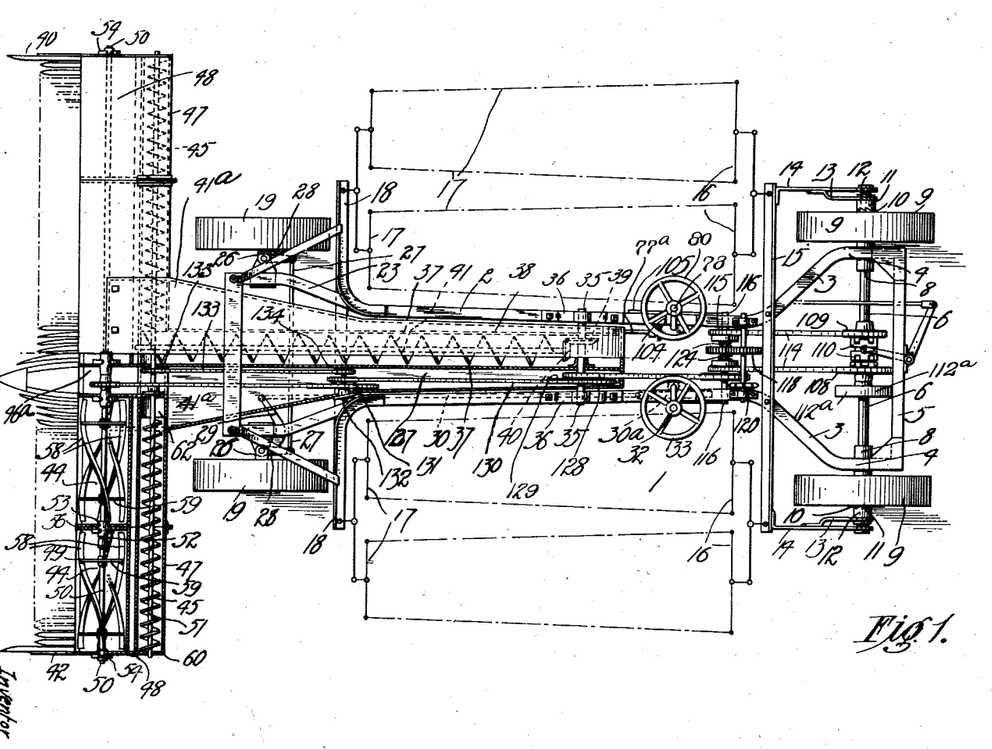
Figure 1 is a view in plan of the improved machine constructed according to this invention.

The reaper frame is mounted upon the fulcrum 35 supported by the bearing 36 on the main frame members 2 and extends forwardly between the side draft appliances and between the main beams of the frame above described, terminating in a widened portion 41ª as shown in Fig. 1 from which extends, from approximately both sides of the center, the unit sections which constitute the reaping mechanism, and which are arranged transversely and forwardly of the reaper frame 38.

The reaping mechanism comprising either fixed or adjustable combs 42, beaters 44, and screw conveyers 45, of suitable width, the frame at either side of the center 46ª being divided into two or more detachable units or sections 47, so that the width of swath of the machine can be extended or reduced. Further the unit sections being detachable, can readily be removed for transportation or other purposes according to prevailing conditions.

The beater frame or drum 48, inclosing the beaters 44 and conveyers 45 and supporting the combs 42 is divided instead of being as a single part into unit sections, each of which has flanges to be placed end for end and flush with each other, said sections being held or strapped together by suitable fastening means, as at 49. The driving spindles 50 of the reaper are also divided, as at 52, the spindles having squared ends which pass within holding collars or sleeves 53 supported or held by any suitable adjustable bearing, such as 54, or other means, the bearings 54 as illustrated, being adjustable by the nuts 55.

Where the beater and screw conveyer casings are divided, as at 52, they are preferably formed with drum cheeks or flanges 56 resting flush against each other, being held by the bolts 49 or other fastening devices, while suitable supporting stays or members may extend from the reaper frame to provide end supports for the detachable sections 47.

At approximately the center of the reaper frame, as at 46ˣ, the beaters 44 and the conveyers 45 are divided to allow of the mounting of the driving gear thereon.

The beaters 44 comprise blades 58 arranged spirally as illustrated, or they may be of any other preferred construction, being supported by spiders 59 upon the beater spindle 50 in the usual way and operate over and to the rear of the combs 42, being adapted to throw the material to the rear into a trough or casing 60 within which the screw conveyers 45 operate. The center of the screw conveyers 45 are positioned slightly above the beater spindle 50 and to the rear of the beaters, see Fig. 3, the material being carried by the screw conveyers to approximately the center into the rear conveyer casing 38. Owing to the particular arrangement of the conveyer 37 on one side of the center of the machine, the material is delivered into the casing 38 from the conveyer 45 on the other side of the center of the machine by a throat or chute 62, and is then carried by the longitudinal screw 37 to the rear of the reaper frame.

Figures 2, 3, 4, 5:
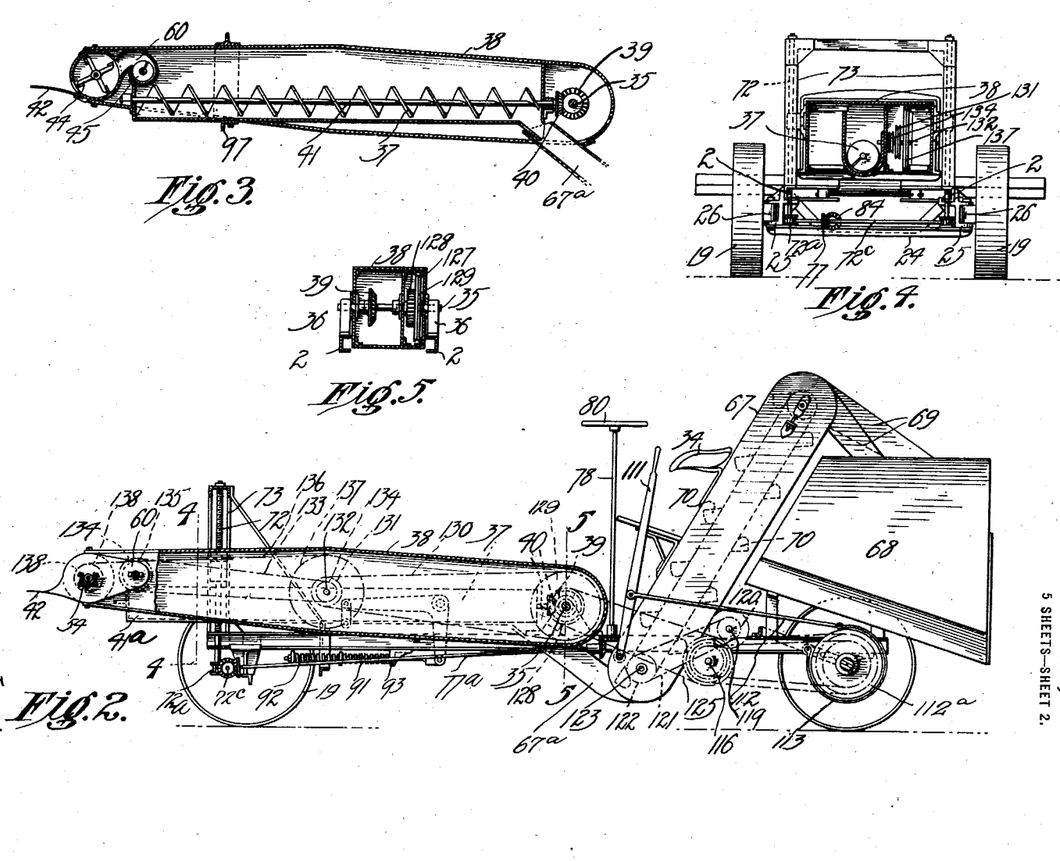
Fig. 2 is a view in side elevation drawn partly in section to more clearly illustrate the reaper mechanism.
Fig. 3 is a view in longitudinal section of a modified arrangement of the reaper mechanism.
Fig. 4 is a view in transverse section taken on the line 4—4 Fig. 2.
Fig. 5 is a view in section of the fulcrum support for the reaper mechanism taken on the line 5—5 Fig. 2.

As illustrated in Figs. 1, 2 and 3, the longitudinal conveyer 37 is inclosed within a casing 38 and is driven from the fulcrum spindle 35, the material being delivered through the throat 67$^a$ to a diagonally arranged elevator 67 suitably incased, which in turn delivers the material to a receiving box 68.

The elevator 67 is preferably formed with one or more delivery chutes 69 leading into the grain box 68 in order to insure the even feeding of the material into the box 68, while if desired, the angle of the buckets 70 may be so arranged as to give a varied throw of the material into the box.

In lieu of a receiving box 68 the elevator 67 may be arranged to deliver the material into threshing and winnower mechanism of any suitable or known design so providing a combined harvesting machine. Alternatively a thresher or grain cleaning mechanism may be arranged either partly or wholly immediately to the rear of the front reaping frame.

The forward end of the reaper frame, immediately to the rear of the front wheels, is normally supported by the front draft bar 18 and the devices for adjusting the reaper frame vertically.

Figure 6:
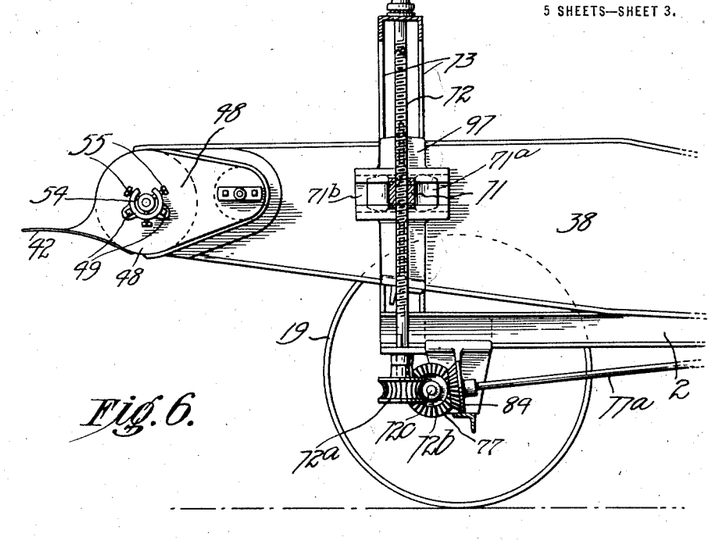
Fig. 6 is a view in side elevation of the mechanism employed for adjusting the reaper mechanism vertically.
Figure 7:
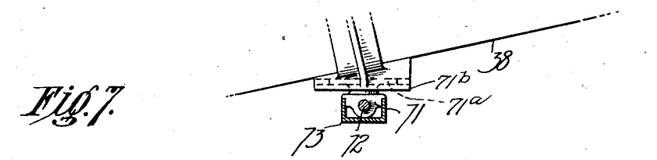
Fig. 7 is a detail view of a portion of the reaper adjusting mechanism illustrated in Fig. 6, showing the guide in section.

These adjusting devices for raising and lowering the reaper frame preferably comprise a pair of fixed nuts or threaded collars 71 slidably mounted to have a limited movement to either side of the reaper frame or casing 38. Each of the nuts or collars 71 is in threaded engagement with a threaded bar 72 arranged vertically in supports 73 fitted to the main frame 1. The bars 72 are provided with worm wheels 72$^a$ meshing with worms 72$^b$ on a transverse shaft 72$^c$, see Fig. 6. The shaft 72$^c$ has a bevel gear 77 meshing with a bevel gear 84 on a shaft 77$^a$ geared to a vertical rod 78 extending upwardly in supports and having a wheel 80 adjacent the driver's seat 34 and located at the side of the frame opposite to the side at which the steering wheel is located. The worm shaft 72$^c$ connecting the worm wheel 72$^a$ of both the threaded rods 72 extends transversely across the front of the main frame 1.

Thus when the train of gears is rotated, the threaded rods 72 cause the fixed nuts or collars 71 threaded thereon to move up or down according to the direction of rotation, the reaper frame being thereby raised or lowered to suit the depth of cut, while the fixed nuts allow of the arcuate movement of the fulcrum frame, which, however, owing to the long radius from its fulcrum 35 maintains the combs practically horizontal in their up or down movement.

The threaded rods 72, upon which the reaper mechanism is raised or lowered, are supported upon and within a forward vertical frame 73 rigidly secured to the main frame 1, and within the vertical frame the reaper frame is reinforced by a metal band or the like 97 to which is connected the fixed nuts 71 working on the threaded bars or rods 72, so providing the necessary support and stability for the reaper frame at this point.

The fixed nuts 71 are each provided with a slide head 71$^a$ adapted to extend into and be guided by a guide 71$^b$ carried by the reaper frame so that as the nuts are raised or lowered they can have a movement relative to the reaper frame, since the frame swings in an arcuate path while the nuts have a vertical rectilinear movement.

Figure 8:
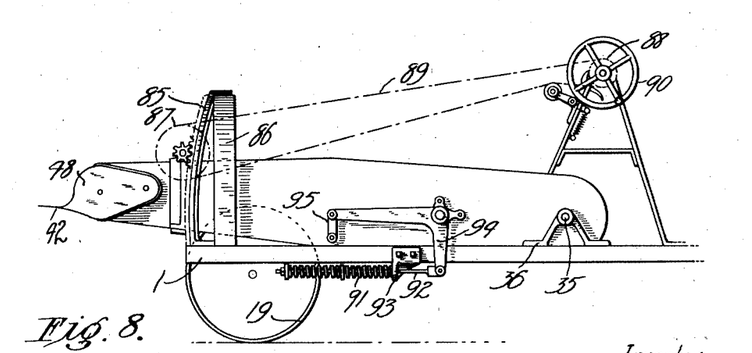
Fig. 8 is a view in side elevation of a modified construction and arrangement of the reaper adjusting mechanism embodying special counter-balancing mechanism for the reaper frame.

In the modification illustrated in Fig. 8, the reaper may be raised and lowered about the fulcrum 35 by means of a fixed rack 85 fitted to the forward end of the main frame 1, and the supporting frame 86. Engaging this rack 85 is a pinion 87 the spindle of which is operated by gear wheels 87, 88, in gear by a chain or the like 89 and operated from the hand wheel 90. It will be readily understood that the raising and lowering mechanisms above described may be automatically operated by power if so desired.

In any form of the invention the weight of the reaper frame may be suitably counterbalanced by means of a spring 91 mounted on a horizontal bar 92 supported on a bracket 93 and connecting a bell crank 94 pivoted to the main frame and connected to a link 95, the opposite end of which is pivoted to the reaper frame.

The receiving or grain box may be fixed as illustrated in Fig. 2 and provided with a sliding or hinged delivery door. In the modified construction of grain box illustrated in Fig. 13 the elevator 67 may be fitted with an inclined delivery chute 96 formed with holes 97$^a$ to allow of an even spread of the material into the grain box 68. Alternatively and as illustrated in Fig. 14 a perforated conical spreader 98 may be arranged within the grain box so that it is adapted to receive the material from the chute 96 and spread the material evenly into the grain box.

Figure 13:
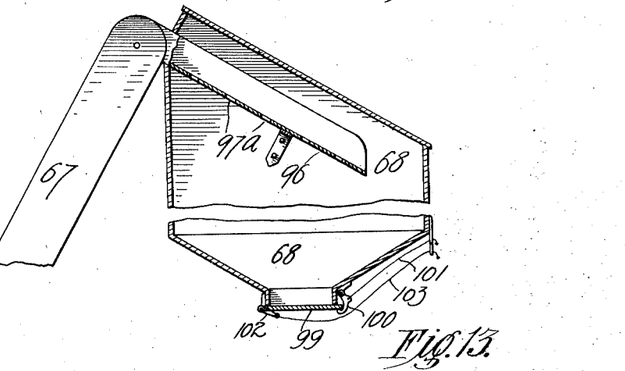
Figs. 13 and 14 are views in section illustrating modified constructions of grain box.
Figure 14:
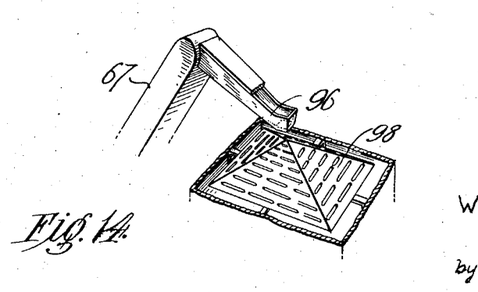

The underside of the grain box is preferably tapered being fitted with a delivery door 99, see Fig. 13, held by a pivoted retaining catch 100 connected by a flexible controlling connection 101. The hinged end of the door 99 is provided with an arm 102 engaging a flexible connection 103. Both the flexible members 101, 103 pass through loops fitted to the grain box in such a manner that the door is easily opened and closed from the side of the box, the flexible connection 101 on a pull being adapted to release the door, which is returned to its closed position upon a pull being exerted on the arm 102 by means of the flexible connection 103.

Figure 9:
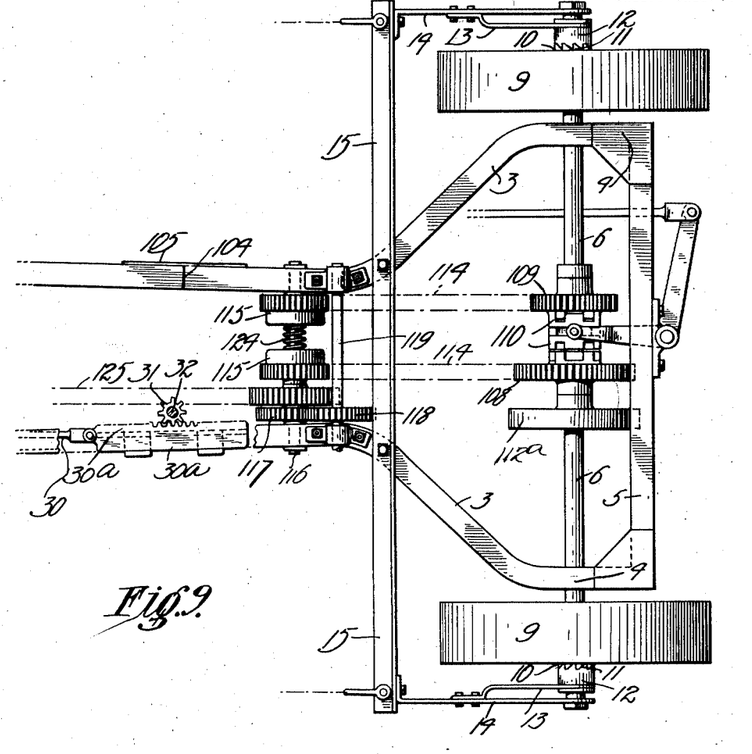
Fig. 9 is a view in plan of the preferred arrangement of drive from the rear wheels.
Figure 10:
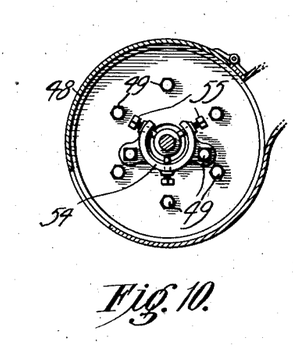
Fig. 10 is a view in transverse section of the beater drum, beater spindle and bearings therefor.
Figure 11:
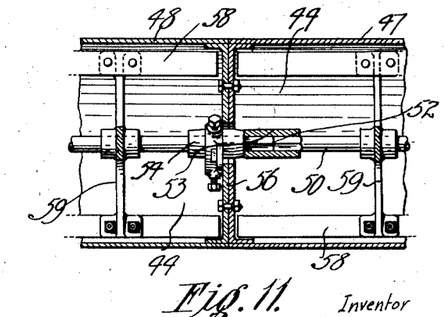
Fig. 11 is a view in longitudinal section of the means employed for joining the ends of the beaters, and conveyers of the unit sections.

The main frame bars are divided at 104 and are held together by a strengthening plate 105 arranged within the channel and bolted to the bars or beams on either side of the division, see Fig. 9.

In the modification illustrated in Fig. 12 a power generator 20 may be utilized for driving the machine and the operative parts or alternatively the horse draft may be utilized for transporting the machine while the power generator may be embodied for driving the mechanism. In Fig. 12 the power generator such as an internal combustion engine 20 is geared to a countershaft 22 from which a chain drive extends to a gear case and clutch mechanism on the rear axle while the other parts such as the beaters, conveyers, and elevators may be operated by separate chain 22ª or other drive from the countershaft 22.

In the construction illustrated in Fig. 1 and also Fig. 9, the moving parts are driven from pulleys or sprocket wheels 108, 109 of different sizes rotatably mounted on the rear axle 6 and adapted to be thrown into or out of operation by a clutch 110 operated from the driver's seat. A controlling lever 111 is also fitted adjacent the driver's seat and connects by a link 112 with a brakeband 113 arranged around a brake wheel 112ª on the rear axle.

From the variable speed gear comprising two gears 108, 109, and a clutch 110, chains 114 extend to sprockets 115 on a countershaft 116 arranged immediately forwardly of the rear draft bar and on this countershaft is mounted a pinion 117 engaging another pinion 118 on a shaft 119 carrying a sprocket 120 gearing by a chain 121 with another sprocket 122 on the lower elevator spindle 123, see Fig. 2.

In Fig. 9, a slightly modified arrangement of the gearing is shown in which the sprocket 120 for the elevator driving mechanism shown in Fig. 2 is omitted. In this arrangement of the gearing the sprocket 120 may be mounted in any suitable positions on the countershaft 119 preferably on the end of the shaft outside the main beam.

The countershaft 116 is fitted with clutch mechanism for the variable speed gearing mounted thereon and the clutch consists preferably of a plurality of frictional disk or cone members forming a dog clutch and frictional drive, the frictional drive being positive owing to being always under the action of the compression spring 124. A chain 125 gears with a sprocket on the countershaft 116 and extends forwardly to a sprocket on the fulcrum spindle 35 above described.

Upon this fulcrum spindle 35 within the conveyer casing 38 is mounted a bevel wheel 39 gearing with a bevel 40 on the conveyer shaft 41 to operate the same.

To one side of the conveyer casing 38 and separate therefrom by a wall is a gear casing 127 within which the forward driving mechanism is located and within this gear casing 127, the sprocket 128 driven by the countershaft 116 is arranged. Mounted upon the fulcrum spindle 35 within the gear casing 127 above mentioned, is a V pulley 129 carrying a V belt 130 which extends forwardly to a further V pulley 131 mounted upon the spindle 132. From the spindle 132 a separate V belt drive allows of the speed increasing drive to the beaters and speed reducing drive to the conveyers to be maintained. In order to accomplish this a V belt 133 connects pulleys 134, 135, on the spindle 132 above mentioned and the conveyer spindle 51 respectively.

Another V belt 136 is driven by another V pulley 137 on the spindle 132 forwardly to a similar V pulley 138 on the beater spindle. By using the V belt drive in the manner above described, a sufficient grip is maintained to insure a positive drive while at the same time should choking occur at any part of the reaper mechanism, the belt or belt pulleys or both of them would slip and the drive from the rear axle would run free so obviating the chain breakage that at present occurs, when the reaper mechanism becomes choked.

It will be readily understood that the drive may consist solely of V belts and pulleys commencing from the pivot spindle 35 and extending forwardly to the reaper mechanism through intermediate shafts or the drive may be partly chain and sprocket as will be readily understood.

As above described, by the use of differential gear wheels on the rear axle or countershaft, the speed of the beater may be varied to suit conditions while the gear wheels may be mounted upon ball or roller bearings to reduce the draft.

I claim as my invention:—

1. In a harvesting machine, the combination of a main frame comprising two substantially parallel longitudinally arranged beams close to each other and each formed in two parts rigidly connected together; front and rear ground wheels mounted on the main frame for supporting the frame; front draft bars fixed to the main beams to the rear of the front ground wheels; rear draft bars fixed to the main beams forwardly of the rear ground wheels, said front and rear draft bars being adapted to receive animal draft appliances; reaping mechanism fulcrumed on the main frame for movement in a vertical plane; means for adjusting the forward part of the reaping mechanism in a vertical plane; means for counter-balancing the weight of the reaping mechanism for facilitating said adjustment; transverse and longitudinal conveying mechanism associated with the reaping mechanism and mounted to be adjusted with the reaping mechanism; variable speed driving mechanism operated from the rear ground wheels whereby the reaping and conveying mechanism may be operated at different speed with respect to the forward travel of the machine; driving means from the variable speed drive to the reaping mechanism; and separate driving means from the variable speed drive to the conveyer mechanism whereby the speed of operation of the conveyer mechanism may be different from the speed of the reaping mechanism.

2. In a harvester the combination of a frame; supporting means therefor; a harvesting element mounted on said frame, said element comprising a plurality of relatively short units each having a comb and reel and being separable from each other and capable of being connected together and to the frame of the machine; and means for securing said units together and to the frame of the machine.

3. In a harvester, the combination of a frame; supporting means therefor; a harvesting element mounted at the forward part of said frame, said element comprising a plurality of separable units each having a comb and reel and being complete in itself and capable of being connected end-for-end with each other and to the frame of the machine; and means for securing said units together and to the frame of the machine.

4. In a harvester, the combination of a frame; supporting means therefor; a harvesting element, said element comprising a plurality of separable units each having a comb and reel and being complete in itself and capable of being connected end-for-end with each other and with part of the frame; means for securing the units together; and means on said frame for supporting said units and to which said units are connected.

5. In a harvester, the combination of a main frame; supporting means therefor; a harvesting element adapted to be supported by the main frame, said element comprising a plurality of separable units each having a comb and reel and being complete in itself and capable of being connected to each other end-for-end; and means whereby said units may be connected to either or both sides of the main frame whereby the width of the swath taken by the machine may be varied at will and may be located at either or both sides of the frame of the machine.

6. A detachable and separate harvester unit comprising a casing; a shaft mounted in the casing and having its ends protruding from said casing; and a harvester reel mounted on said shaft and located within said casing.

7. A detachable and separable harvester unit having means whereby it may be mounted on a harvesting machine and comprising a casing; a shaft mounted in said casing and having its ends protruding therefrom, a harvesting reel mounted on said shaft and located within said casing; and a comb bar mounted on said casing in front of said reel.

8. A detachable and separable harvester unit having means whereby said unit may be mounted on a harvesting machine and comprising a casing; and a comb bar mounted thereon.

9. A detachable and separate harvester unit having means whereby it may be mounted on a harvesting machine comprising a casing; a shaft mounted in said casing and having its ends protruding therefrom; a harvesting reel mounted on said shaft and located in said casing; and a comb bar mounted on said casing in front of the reel.

10. In a harvester machine the combination of a frame; ground wheels supporting said frame; reaper mechanism located at the forward part of the machine; and means for pivotally supporting the reaper mechanism said means being mounted on the frame substantially midway of the forward and rearward ground wheels.

11. In a header harvester the combination of a frame; ground wheels for supporting said frame at substantially the height of the heads of grain to be harvested; header mechanism located at the forward part of the machine; a pivotal mounting for the header mechanism mounted on the frame substantially midway thereof; and means located forwardly of the pivotal mounting for adjusting said header mechanism in a substantially vertical plane.

12. In a harvester the combination of a main frame; reaper mechanism and a reaper frame therefor having a pivotal mounting on said main frame; a yoke mounted at the forward part of the main frame; screw-threaded rods rotatably mounted in said yoke; screw-threaded blocks carried by the reaper frame and engaging the screw-thread portion of said rods; and means for rotating said rods to raise or lower the reaper mechanism and the frame thereof.

13. In a harvester the combination of a main frame; reaper mechanism and a reaper frame therefor having a pivotal mounting on the main frame; a yoke mounted at the forward part of the main frame; screw-threaded rods rotatably mounted in said yoke; screw-threaded blocks engaging said rods; guides for said blocks mounted on said yoke; a slide head secured to each block; and guides carried by the reaper frame in which said slide heads are mounted for sliding movement transversely thereof when the blocks are moved vertical, by the rotation of said rods, to raise or lower the reaper mechanism and frame.

14. In a harvesting machine the combination of a frame; supporting means therefor comprising front and rear ground wheels; reaper mechanism supported by the frame; and driving means from the rear ground wheels to the reaper mechanism comprising a belt drive adapted to allow slip in the drive when the reaper mechanism becomes choked due to the grain on which it is operating.

15. In a harvesting machine; reaper mechanism; ground wheels for driving the reaper mechanism; and driving connections between the reaper mechanism and the ground wheels comprising variable speed gearing connected to the ground wheels, a counter-shaft, clutch mechanism on the counter-shaft, and a belt drive connecting the variable speed gearing to the counter-shaft.

16. In a harvesting machine, the combination of a frame; supporting means for the frame; reaper mechanism mounted at the forward part of the frame and divided into two parts, one at each side of the center of the frame; transverse conveyers associated with each part of the reaper mechanism and directing the cut grain to the center of the machine; and a conveyer arranged longitudinally of the machine and at substantially the center thereof adapted to receive the cut grain from the transverse conveyers and deliver the grain to the rear of the machine.

17. In a harvesting machine the combination of a frame; supporting means therefor; reaper mechanism mounted at the forward part of the frame and divided into two parts, one part at each side of the center of the frame; a transverse conveyer associated with each part of the reaper mechanism and directing the cut grain to the center of the machine; a conveyer arranged longitudinally of the machine frame and at substantially the center thereof adapted to receive the grain from the transverse conveyers and deliver the grain to the rear of the machine; a housing for the longitudinal conveyer; driving means for the transverse conveyers; and a casing for said driving means adjacent the housing for the longitudinal conveyer.

18. In a harvesting machine the combination of a frame; supporting means therefor; reaper mechanism mounted at the forward part of the frame and divided into two parts, one at each side of the center of the frame; a transverse conveyer associated with each part of the reaper mechanism and directing the cut grain to the center of the machine; a conveyer arranged longitudinally of the machine frame and at substantially the center thereof adapted to receive the grain from the transverse conveyers and deliver the same to the rear of the machine; and means for separately driving the transverse and longitudinal conveyers.

19. In a harvesting machine the combination of a frame; supporting means therefor; reaper mechanism pivotally mounted on said frame and located at the forward part thereof, said reaper mechanism comprising two parts, one located at each side of the center of the machine; a transverse conveyer associated with each part of the reaper mechanism and directing the cut grain to the center of the machine; a conveyer mounted on the reaper frame arranged longitudinally of the machine at substantially the center thereof adapted to receive the grain from the transverse conveyers, said longitudinal conveyer extending to approximately the pivot point of the reaper frame and there having an outlet; and a receptacle mounted on the main frame and having an inlet into which the outlet of the longitudinal conveyer extends for receiving the cut grain from the longitudinal conveyer.

Signed at Perth, in the State of Western Australia, and Commonwealth of Australia, this third day of May, A. D. 1918.

WILLIAM FRANCIS de BRANDT.

Witnesses:
 HARRY HALE,
 J. W. WESTAWAY.